(12) United States Patent
Choi

(10) Patent No.: US 9,701,206 B2
(45) Date of Patent: Jul. 11, 2017

(54) REGENERATIVE BRAKING CONTROL METHOD OF HYBRID VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/690,136

(22) Filed: Apr. 17, 2015

(65) Prior Publication Data

US 2016/0152144 A1     Jun. 2, 2016

(30) Foreign Application Priority Data

Nov. 27, 2014   (KR) .................. 10-2014-0167584

(51) Int. Cl.
| | | |
|---|---|---|
| *B60L 7/26* | (2006.01) | |
| *B60W 20/00* | (2016.01) | |
| *B60W 20/40* | (2016.01) | |
| *B60W 20/30* | (2016.01) | |
| *B60L 15/20* | (2006.01) | |

(52) U.S. Cl.
CPC ............. *B60L 7/26* (2013.01); *B60L 15/2009* (2013.01); *B60W 20/00* (2013.01); *B60W 20/30* (2013.01); *B60W 20/40* (2013.01); *B60L 2240/12* (2013.01); *B60L 2240/421* (2013.01); *B60L 2240/423* (2013.01); *B60L 2250/28* (2013.01); *B60W 2520/04* (2013.01); *B60W 2710/1005* (2013.01); *B60W 2710/182* (2013.01); *Y02T 10/645* (2013.01); *Y02T 10/72* (2013.01); *Y02T 10/7275* (2013.01); *Y10S 903/945* (2013.01); *Y10S 903/947* (2013.01)

(58) Field of Classification Search
CPC .... B60L 7/26; B60L 15/2009; B60L 2240/12; B60L 2240/421; B60L 2240/423; B60L 2250/28; B60W 20/00; B60W 20/30; B60W 20/40; Y10S 903/947; Y10S 903/945; Y02T 10/645; Y02T 10/7275; Y02T 10/72
USPC ...................... 701/22, 70; 903/903, 945, 947
See application file for complete search history.

(56) References Cited

U.S. PATENT DOCUMENTS

| | | | | |
|---|---|---|---|---|
| 4,827,798 | A * | 5/1989 | Oldfield ................... | B60T 1/10 188/269 |
| 5,085,101 | A * | 2/1992 | Oldfield ................... | B60T 1/08 188/270 |
| 6,120,115 | A * | 9/2000 | Manabe ................... | B60T 8/00 188/156 |

(Continued)

FOREIGN PATENT DOCUMENTS

| | | |
|---|---|---|
| JP | 5-176409 A | 7/1993 |
| JP | 2002-89688 A | 3/2002 |

(Continued)

*Primary Examiner* — Fadey Jabr
*Assistant Examiner* — Angelina Shudy
(74) *Attorney, Agent, or Firm* — Morgan Lewis & Bockius LLP

(57) ABSTRACT

A regenerative braking control method of a hybrid vehicle may include determining whether to perform regenerative braking in a regenerative braking determining step, determining whether to stop an engine in an engine stopping determining step, and performing shifting to a lowest gear stage driven by a motor in a preceding shifting step if it is determined in the engine stopping determining step that the engine stops.

6 Claims, 2 Drawing Sheets

(56) References Cited

U.S. PATENT DOCUMENTS

| | | | | |
|---|---|---|---|---|
| 6,642,688 | B1* | 11/2003 | Wallingford | B60L 7/14 318/11 |
| 7,197,383 | B2* | 3/2007 | Tobler | B60K 6/48 701/22 |
| 7,971,668 | B2* | 7/2011 | Ando | B60K 6/445 180/65.265 |
| 9,446,762 | B2* | 9/2016 | Lee | B60W 20/30 |
| 2001/0023666 | A1* | 9/2001 | Suzuki | B60K 6/48 123/2 |
| 2002/0055411 | A1* | 5/2002 | Yoshiaki | B60K 6/48 477/107 |
| 2004/0168841 | A1* | 9/2004 | Ohta | B60K 6/365 180/65.25 |
| 2004/0251064 | A1* | 12/2004 | Imai | B60K 6/442 180/65.23 |
| 2005/0080527 | A1* | 4/2005 | Tao | F16H 59/38 701/31.1 |
| 2006/0207257 | A1* | 9/2006 | Turner | F01B 17/02 60/712 |
| 2007/0205036 | A1* | 9/2007 | Ogata | B60K 6/48 180/337 |
| 2008/0185199 | A1* | 8/2008 | Kimura | B60K 6/445 180/242 |
| 2009/0118947 | A1* | 5/2009 | Heap | B60K 6/445 701/55 |
| 2009/0118963 | A1* | 5/2009 | Heap | B60K 6/365 701/99 |
| 2010/0076657 | A1* | 3/2010 | Jinno | B60K 6/448 701/70 |
| 2010/0125020 | A1 | 5/2010 | Ikegami et al. | |
| 2011/0021311 | A1* | 1/2011 | Kim | B60W 10/08 477/3 |
| 2011/0092334 | A1* | 4/2011 | Baino | B60K 6/387 477/5 |
| 2012/0031692 | A1* | 2/2012 | Koike | B60K 6/48 180/65.25 |
| 2012/0115674 | A1* | 5/2012 | Ikegami | B60K 6/36 477/3 |
| 2013/0035817 | A1* | 2/2013 | Bahar | B60K 6/46 701/22 |
| 2013/0296100 | A1* | 11/2013 | Nefcy | B60W 10/08 477/4 |
| 2014/0009097 | A1* | 1/2014 | Kawati | B60L 7/14 318/497 |
| 2015/0134168 | A1* | 5/2015 | Kawakami | B60K 6/485 701/22 |
| 2015/0258886 | A1* | 9/2015 | Aimo Boot | B60K 17/354 701/22 |
| 2015/0274154 | A1* | 10/2015 | Tsuda | F16H 61/16 701/22 |
| 2015/0283920 | A1* | 10/2015 | Toyota | B60L 7/14 701/22 |
| 2016/0046280 | A1* | 2/2016 | Lee | B60W 20/30 701/22 |
| 2016/0059845 | A1* | 3/2016 | Nefcy | B60W 20/30 477/115 |

FOREIGN PATENT DOCUMENTS

| | | |
|---|---|---|
| JP | 2009-113535 A | 5/2009 |
| JP | 2010-83454 A | 4/2010 |
| JP | 2011-73574 A | 4/2011 |
| KR | 10-2005-0045596 A | 5/2005 |
| KR | 10-2012-0128209 A | 11/2012 |

* cited by examiner

REGENERATIVE BRAKING CONTROL METHOD OF HYBRID VEHICLE

CROSS-REFERENCE TO RELATED APPLICATION

The present application claims priority of Korean Patent Application Number 10-2014-0167584, filed on Nov. 27, 2014, the entire contents of which application are incorporated herein for all purposes by this reference

BACKGROUND OF INVENTION

Field of Invention

The present disclosure relates to a regenerative braking control method of a hybrid vehicle, and more particularly, to a regenerative braking control method of a hybrid vehicle capable of constantly keeping a braking sense during regenerative braking and preventing braking efficiency from reducing.

Description of Related Art

A hybrid vehicle means a vehicle which is driven by efficiently combining two different power sources, and in most cases, means a vehicle which is driven by an engine obtaining a torque by combusting fuel (fossil fuel such as gasoline) and an motor (motor/generator) obtaining a torque by battery power.

The hybrid vehicle has a great potential since it adopts an engine and an electric motor (motor/generator) as an auxiliary power source to be able to reduce exhaust gas and enhance fuel efficiency and a study on the hybrid vehicle has been actively conducted to meet the demands of the times which have to enhance fuel efficiency and develop environmentally-friendly products.

Meanwhile, a recent hybrid vehicle uses a dual clutch transmission (DCT) which may transfer a driving force to a vehicle wheel without interrupting a supply of power from a power source.

The dual clutch transmission is configured to connect a shaft (main shaft) of any one of an odd transmission mechanisms having odd-numbered shift stages (1, 3, 5, 7 stages, and the like) and even transmission mechanisms having even-numbered shift stages (2, 4, and 6) to a motor (motor/generator) side.

The hybrid vehicle in which the dual clutch transmission is equipped uses some of the braking force generated at the time of braking for power generation of the motor to perform a regenerative braking function which uses the generated electric energy to charge the battery.

That is, the regenerative braking is a braking method which uses some of kinetic energy by a driving speed of the vehicle as energy required to drive the motor to generate electric energy while reducing (reducing the driving speed) the kinetic energy.

According to the existing regenerative braking method of a hybrid vehicle, when the shift stage (gear stage) is changed in the transmission mechanism connected to the motor during the regenerative braking, after the torque of the motor is to be "0", the shifting is performed by a dog clutch, and the like and then the regeneration of the motor is performed, such that the braking sense may vary.

To solve the above disadvantages, when the torque of the motor is "0", a control method for compensating for a braking force by increasing an oil pressure of a brake or using an engine brake has been used. However, in the case of the control method, kinetic energy is not appropriately recovered during shifting, and as a result, the efficiency of the regenerative braking may be extremely reduced.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present disclosure has been made to solve the above-mentioned and/or other problems occurring in the prior art while advantages achieved by the prior art are maintained intact.

Various aspects of the present disclosure provide a regenerative braking control method of a hybrid vehicle capable of constantly keeping a braking sense by preventing shifting for being performed during regenerative braking and preventing efficiency of regenerative braking from reducing since shifting is not performed.

According to an aspect of the present disclosure, a regenerative braking control method of a vehicle includes: determining, in a regenerative braking determining step, whether to perform regenerative braking; determining, in an engine stopping determining step, whether to stop an engine; and performing shifting, in a preceding shifting step, to a lowest gear stage driven by a motor, if it is determined in the engine stopping determining step that the engine stops.

In the regenerative braking determining step, the regenerative braking may be performed by turning off an accel position sensor (APS).

In the engine stopping determining step, the determining of whether to stop the engine may depend on whether to charge a battery.

In the preceding shifting step, shifting to the lowest gear stage among gear stages meeting a max RPM of the motor at a current vehicle speed may be performed.

The regenerative braking control method of a vehicle may further include: after the preceding shifting step, determining, in a motor RPM determining step, whether an RPM of the motor is equal to or less than a rated RPM depending on deceleration of a vehicle speed.

The regenerative braking control method of a vehicle may further include: determining, in a request torque determining step, whether a request torque of a brake is larger than a maximum torque output at a current gear stage, if it is determined in the motor RPM determining step that the RPM of the motor is equal to or less than the rated RPM.

The regenerative braking control method of a vehicle may further include: accomplishing, in an engine brake step, the request torque of the brake using friction force of the engine through engagement of a clutch, if it is determined that the request torque of the brake is larger than the maximum torque of the motor.

The regenerative braking control method of a vehicle may further include: after the engine brake step, determining, in a torque sum determining step, whether a maximum sum of the torque provided by the engine and the motor is smaller than the request torque of the brake.

The regenerative braking control method of a vehicle may further include: increasing, in a brake oil pressure increasing step, a brake oil pressure to satisfy the request torque of the brake, if it is determined in the torque sum determining step that the maximum sum of the torque is smaller than the request torque of the brake.

According to another aspect of the present disclosure, a regenerative braking control method of a vehicle may include: performing shifting to a lowest gear stage within a range in which a vehicle is driven by a motor at a current vehicle speed, if it is determined that a regenerative braking is performed.

The regenerative braking control method of a vehicle may further include: determining whether the engine stops, after it is determined that the regenerative braking is performed, wherein the shifting is performed to shift to an optimal gear stage within the range in which the vehicle is driven by the motor at the current vehicle speed, if it is determined that the engine stops.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
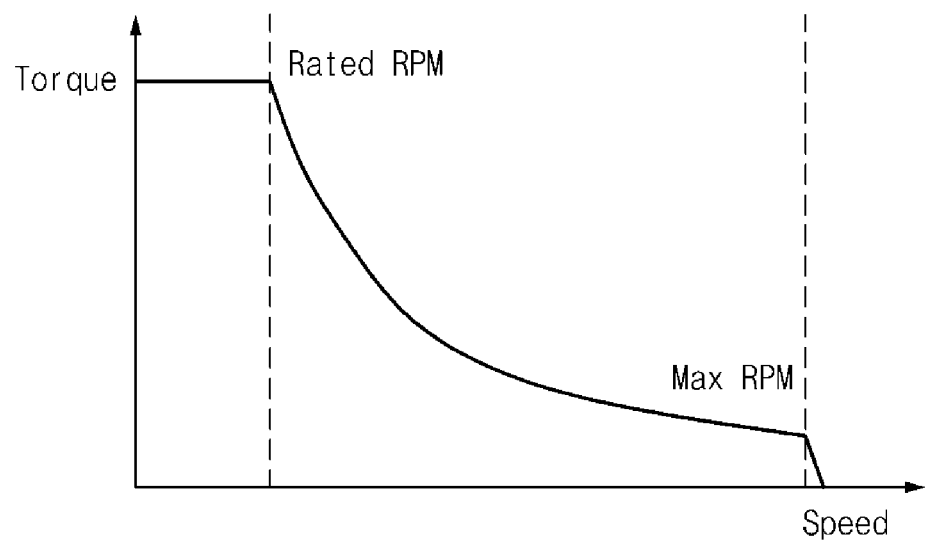
FIG. 1 is a motor-torque diagram illustrating a relationship between a motor and a torque.
Figure 2:
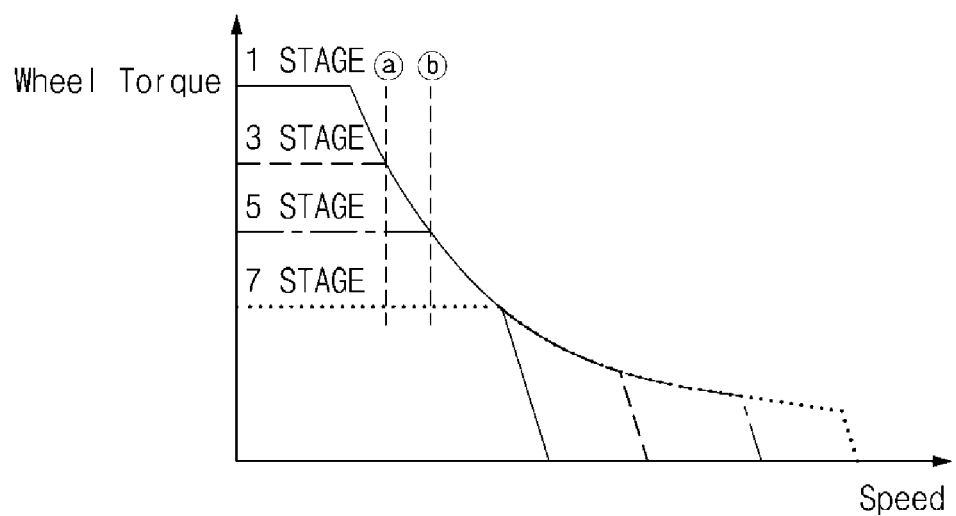
FIG. 2 is a graph illustrating a relationship between regenerative torques for each gear stage and RPM of a motor.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

For reference, a size of components, a thickness of lines, etc., which are illustrated in the drawings reference to describe the present disclosure may be slightly exaggerated for convenience of description. Further, terms used to describe the present disclosure are defined in consideration of functions in the present disclosure and therefore may be changed depending on an intention, a practice, and the like of a user and an operator. Therefore, the definition of the terminologies should be construed based on the contents throughout the specification.

Figure 3:
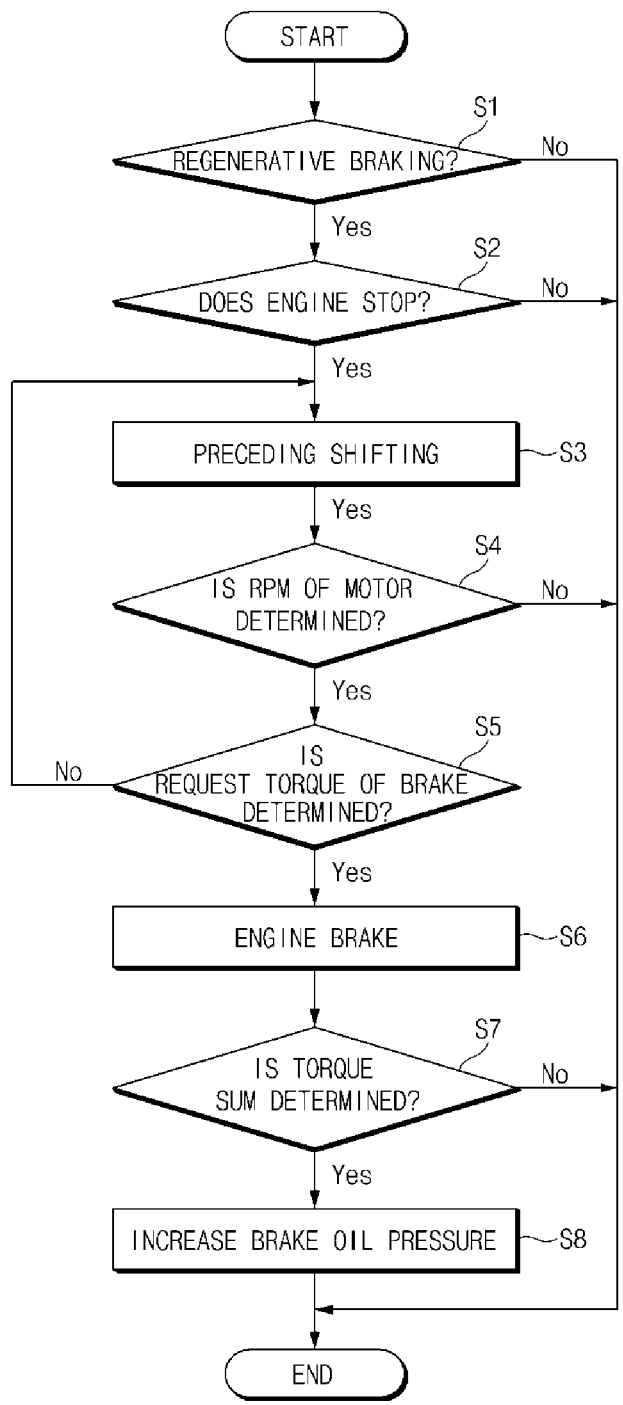
FIG. 3 is a flow chart illustrating a regenerative braking control method of a hybrid vehicle according to an exemplary embodiment of the present disclosure.

FIG. 3 is a flow chart illustrating a regenerative braking control method of a hybrid vehicle according to some exemplary embodiments of the present disclosure.

First, a regenerative braking determining step (S1) of determining whether to perform regenerative braking is performed. In the determination condition of the regenerative braking determining step (S1), when an accel position sensor (APS) is turned off, it is determined that the regenerative braking is performed. Here, it may be accurately determined whether the accel position sensor is turned off by referring to a brake position sensor (BPS), and the like.

If it is determined that the regenerative braking is performed, an engine stopping determining step (S2) of determining whether to stop the engine is performed.

In the engine stopping determining step (S2), the situations in which the engine stopping is not performed are various. An example thereof is as follows.

First, when the accel position sensor (APS) is turned off while a general internal combustion engine vehicle is driven at a relatively higher vehicle speed, a vehicle is in a coasting state and in the coasting state, an engine performs fuel cut and thus a drag torque of the engine is applied to the vehicle to constantly decelerate. On the other hand, to obtain deceleration similar to the internal combustion engine vehicle, the hybrid vehicle performs coasting charging at a similar size or amount to the drag of the engine. At the time of the coasting charging, a state of charge (SOC) of a battery is increased and thus when the charging may not be made, the coasting drag is generated in the engine without stopping the engine and thus there is no need to implement the regenerative braking.

Further, if it is determined in the engine stopping determining step (S2) that the engine stops, a preceding shifting step (S3) of preceding shifting to a lowest gear stage which may be driven by the motor is performed.

As illustrated in FIG. 1, since the motor is a dynamic power source, the torque of the motor is constant up to a rated RPM, but the torque is gradually decreased after that. Therefore, at the rated RPM or more, the regenerative braking may be made independent of RPM and therefore the power thereof is the same. Therefore, when the preceding shifting to a lowest gear stage meeting or reaching a max RPM of the motor at the current vehicle speed is performed, the low gear stage is shifted in advance even though the vehicle speed is decelerated and therefore the unnecessary shifting may be avoided.

As described above, since the shifting is not performed, the braking sense at the time of the regenerative braking is constant and the efficiency of the regenerative braking may be prevented from reducing.

An example of the preceding shifting step S3 will be described in detail below.

In the hybrid vehicle in which the motor is connected to an odd transmission mechanism, an example of a vehicle speed depending on the gear stage and the RPM is shown in Table 1.

TABLE 1

| | 1 stage | 2 stage | 3 stage | 4 stage | 5 stage | 6 stage | 7 stage | final reduction gear ratio |
|---|---|---|---|---|---|---|---|---|
| gear ratio | 4.83 | 2.86 | 1.92 | 1.37 | 1 | 0.82 | 0.73 | 3.27 |
| RPM/ km/h | 1 stage | 2 stage | 3 stage | 4 stage | 5 stage | 6 stage | 7 stage | |
| 800 | 6 | 10 | 15 | 21 | 29 | 35 | 40 | |
| 1200 | 9 | 15 | 22 | 32 | 43 | 53 | 60 | |
| 2400 | 18 | 30 | 45 | 64 | 87 | 106 | 120 | |
| 3600 | 27 | 46 | 68 | 96 | 131 | 160 | 180 | |
| 4800 | 36 | 61 | 91 | 128 | 175 | 213 | 240 | |
| 6000 | 45 | 76 | 114 | 160 | 219 | 267 | 300 | |
| 7200 | 54 | 92 | 137 | 192 | 263 | 320 | 360 | |
| 8400 | 63 | 107 | 159 | 224 | 306 | 374 | 420 | |

In a case that the max RPM of the motor is 8400 RPM and the rated RPM is 1200 RPM, if the regenerative braking is requested when a vehicle is driven in the state in which a vehicle speed is 120 km/h and a gear stage is 7 stage (or stage 7), a clutch is released to stop the engine and the lowest gear stage which may be driven by the motor at the current vehicle speed is selected. As shown in the above Table 1, the vehicle may be driven by the motor up to 159 km/h at a 3 stage (or stage 3), and therefore the torque of the motor is set to be "0" and then 3 stage shifting at a 7 stage is selected to perform the preceding shifting. Therefore, the regenerative braking may be performed up to 120 from 22 km/h.

Meanwhile, the RPM is equal to or less than the rated RPM at the vehicle speed of 22 km/h, and therefore the charging power of the motor is reduced, but kinetic energy of the vehicle is small at the low vehicle speed and thus regenerative energy is also reduced, such that the RPM needs not to be maintained to be larger than the rated RPM by shifting the gear stage to a lower gear stage on purpose.

Further, a motor RPM determining step (S4) of determining whether the RPM of the motor is equal to or less than the rated RPM due to a gradually reducing vehicle speed after the foregoing preceding shifting step (S3) is performed.

Meanwhile, when the vehicle is driven at a current vehicle speed which is equal to or more than 120 km/h, shifting to 1 stage or 3 stage is not performed, and therefore there may often be a case of shifting to 5 stage. Since the vehicle speed at the rated RPM of 5 stage is 43 km/h, as illustrated in FIG. 3, when the vehicle is driven between point ⓑ and point ⓐ, the regenerative braking may be made at a larger torque at the time of shifting to 3 stage but the braking sense may also be changed.

It is to be understood that the specific values or ranges used herein for RPM, speed, stage and other features are illustrative and non-limiting.

Therefore, to overcome the change in the braking sense while implementing the regenerative braking at the larger torque, the following steps may be additionally or optionally performed.

When the RPM of the motor is equal to or less than the rated RPM, a request torque determining step of the brake (S5) of determining whether a request torque (that is, request regenerative braking torque of the brake) of the brake is larger than a maximum torque (that is, maximum torque which may be output from a current gear stage) of the motor is performed.

In the request torque determining step of the brake (S5), if it is determined that the request torque of the brake is larger or higher than the maximum torque of the motor, an engine brake step (S6) of meeting the request torque of the brake by the engine brake (e.g., friction force of the engine) by a connection of the clutch is performed.

After the engine brake step (S6), a torque sum determining step (S7) of determining whether a maximum sum of the torque by the engine and the motor is smaller than the request torque of the brake is performed.

In the torque sum determining step (S7), if it is determined that the maximum sum of the torque is smaller than the request torque of the brake, a brake oil pressure increasing step (S8) of increasing a brake oil pressure as much as an amount which does not meet the request torque of the brake is performed.

Meanwhile, in the foregoing request torque determining step of the brake (S5), even though the request torque of the brake is larger than the maximum torque of the motor, the engine brake step (S6) to the brake oil pressure increasing step (S8) may also be omitted. Since the torque generated from the motor is constant even though the clutch is connected and thus the engine brake (friction force of the engine) is not used, the braking force generated from the transmission is not changed but when the RPM of the motor is equal to or less than the rated RPM, the charging quantity obtained by the regenerative braking is reduced. Therefore, even though the charging quantity is reduced, when it is expected that the driver feels inconvenience due to the starting of the engine, the motor RPM determining step (S4) to the brake oil pressure increasing step (S8) which are described above may also be omitted.

As described above, according to the regenerative braking control method of a hybrid vehicle according to various exemplary embodiments of the present disclosure, as illustrated in FIG. 3, if it is determined that the regenerative braking is performed (S1), the preceding shifting to the lowest gear stage within the range in which the vehicle may be driven by the motor at the current vehicle speed may be performed (S3). By this, since the shifting into the optimal gear stage is performed in advance even at the time of the deceleration of the vehicle speed depending on the regenerative braking by controlling the gear stage to perform in advance the shifting to the lowest gear stage which may be driven by the motor at the current vehicle speed as soon as it is determined that the regenerative braking is performed, the unnecessary shifting may be avoided and the braking sense may be constantly maintained and it is possible to prevent the efficiency of the regenerative braking from reducing by appropriately performing the regenerative braking in response to the deceleration of the vehicle speed in the state in which the unnecessary shifting is not performed.

Further, after it is determined that the regenerative braking is performed, it is determined whether the engine stops (S2) and if it is determined that the engine stops, the shifting to the lowest gear stage within the range in which the vehicle may be driven by the motor at the current vehicle speed is performed (S3), such that it is possible to more improve the control efficiency of the regenerative braking by performing the shifting into the optimal gear stage in advance only in the case in which the engine stops. The reason is that the regenerative braking is not required due to the coasting drag which is generated by the engine when the engine may not stop.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A regenerative braking control method of a hybrid vehicle, comprising:
   determining, in a regenerative braking determining step, that a regenerative braking is requested;
   releasing, in a clutch releasing step, a clutch connecting an engine and a motor, when it is determined that the regenerative braking is requested; and performing shifting, in a dual clutch transmission, in a preselecting shifting step, to a lowest gear stage driven by the motor, when the clutch is released, after the preselecting shifting step, determining, in a motor revolution per minute (RPM) determining step, whether an RPM of the motor is equal to or less than a rated RPM depending on deceleration of a vehicle speed, wherein in the preselecting shifting step, shifting to the lowest gear stage among gear stages meeting a max RPM of the motor at a current vehicle speed is performed to perform the regenerative braking in a state of maintaining the lowest gear stage.

2. The regenerative braking control method of a hybrid vehicle according to claim 1, wherein the regenerative braking determining step includes determining whether the regenerative braking is requested by turning off an accel position sensor (APS).

3. The regenerative braking control method of a hybrid vehicle according to claim 1, the method further comprising:

determining, in a request torque determining step, whether a request torque of a brake is larger than a maximum torque output at a current gear stage, when it is determined in the motor RPM determining step that the RPM of the motor is equal to or less than the rated RPM.

4. The regenerative braking control method of a hybrid vehicle according to claim 3, the method further comprising:

accomplishing, in an engine brake step, the request torque of the brake using friction force of the engine through engagement of the clutch, when it is determined that the request torque of the brake is larger than a maximum torque of the motor.

5. The regenerative braking control method of a hybrid vehicle according to claim 4, further comprising:

after the engine brake step, determining, in a torque sum determining step, whether a maximum sum of a torque provided by the engine and the motor is smaller than the request torque of the brake.

6. The regenerative braking control method of a hybrid vehicle according to claim 5, further comprising:

increasing, in a brake oil pressure increasing step, a brake oil pressure to satisfy the request torque of the brake, when it is determined in the torque sum determining step that the maximum sum of the torque is smaller than the request torque of the brake.

* * * * *